Patented Oct. 20, 1931

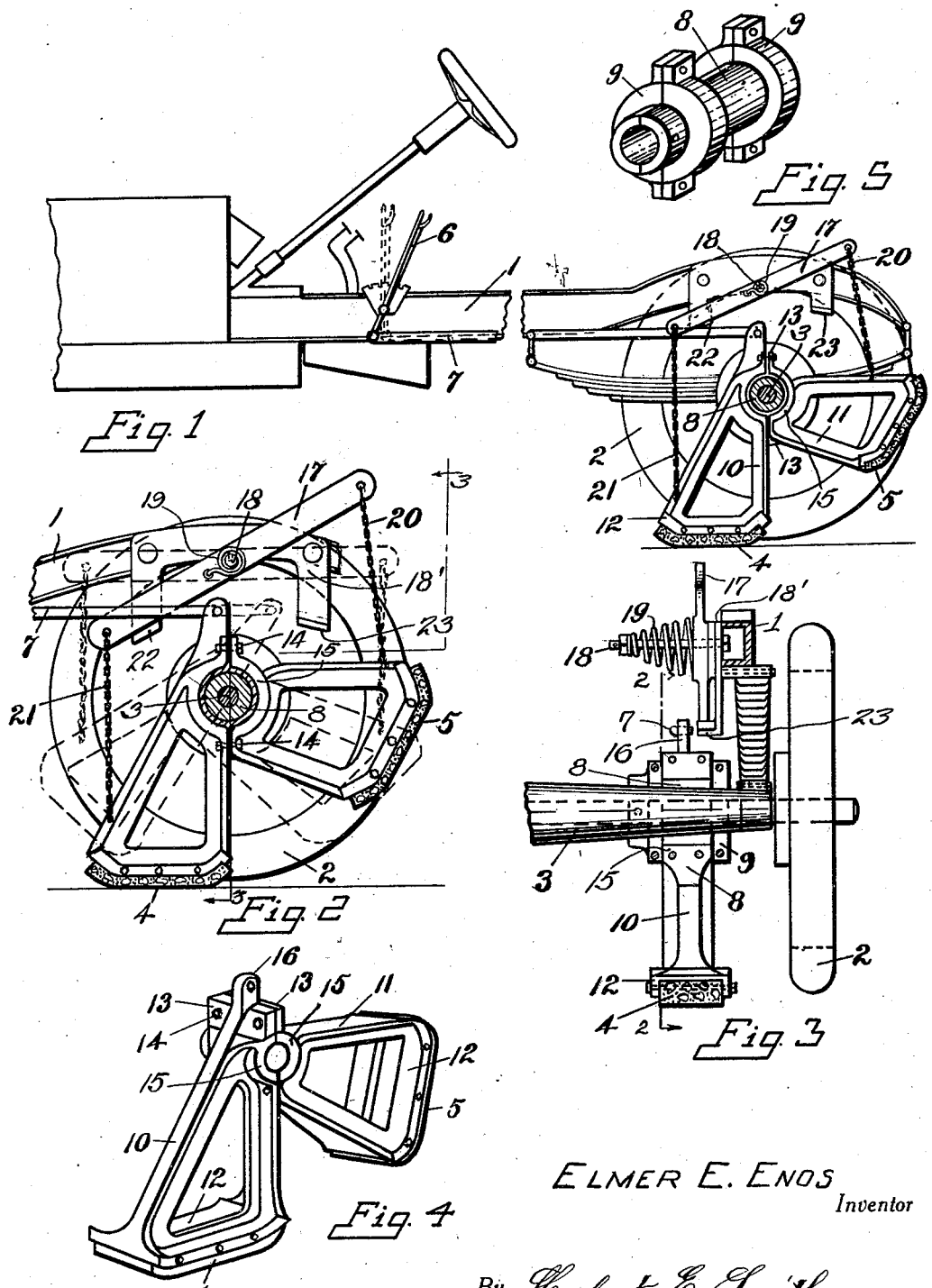

1,827,976

UNITED STATES PATENT OFFICE

ELMER E. ENOS, OF SPOKANE, WASHINGTON

VEHICLE BRAKE

Application filed July 8, 1929. Serial No. 376,538.

My present invention relates to improvements in vehicle brakes of the traction type, employed upon automotive vehicles and operated by the movement under power of the vehicle. The braking devices employed for the two rear wheels are of dual structures, that is, a pair of brake shoes for contact with the ground are mounted adjacent to each rear wheel of the vehicle, and one pair of spaced shoes is used for retarding or stopping forward motion of the vehicle, or one pair of spaced shoes may be employed for retarding or stopping rearward movement of the vehicle or automobile. The brake devices are also capable of being used for jacking up the rear end of the vehicle, or for elevating the rear wheels from the ground for the purpose of making repairs or for changing tires.

Manually controlled means are utilized for shifting the brake devices to working position in order that the motion of the car may be utilized for lifting the rear ends thereof, and after the car has been lowered by a reverse movement, the devices are manually shifted to inoperative position.

Means are provided for normally holding the brake devices in inoperative position, and anti-rattling means are also utilized for preventing development of noises in the brake apparatus.

In the accompanying drawings I have illustrated one complete example of the physical embodiment of my invention wherein the parts are combined and arranged according to the best mode I have thus far devised for the practical application of the principles of my invention.

Figure 1 is a view in side elevation of so much of an automotive vehicle as is necessary to illustrate the adaptation of my invention. Figure 2 is an enlarged detail view in side elevation, as at line 2—2 of Figure 3. Figure 3 is a transverse vertical sectional view at line 3—3 of Figure 2. Figure 4 is a perspective view of one of the dual brake devices, and Figure 5 is a detail perspective view of the axle attachment forming the bearing support for the brake device.

In order that the general arrangement and relation of parts may readily be understood I have shown in Figure 1 a conventional type of automotive vehicle including its chassis 1, one of the rear wheels 2, together with the rear axle 3 and rear driving shaft 3' enclosed therein. Each dual device includes a pair of traction shoes 4 and 5 adapted for contact with the ground in retarding or stopping movement of the vehicle, or for use in jacking up the rear end of the car. The shoe 4 is used for forward movement of the car and the shoe 5 is used for rearward movement, a hand lever 6 and connecting rod 7 being operated for shifting these shoes to operative or inoperative positions.

In installing the brake device on a vehicle I apply a split or sectional bushing 8 that is tapered to conform to the exterior surface of the rear axle housing 3, and split collars 9, 9, are used for clamping the bushing in place and for guides. The split collars are rigidly clamped, as by bolts or screws, on the bushing, and the latter is rigidly secured on the axle by the collars.

The traction shoes are carried on a rigid frame comprising the two angularly disposed arms 10 and 11 which are fashioned with flanges 12 forming seats for the shoes, and the latter are secured in the seats as by screws or bolts.

The shoes are fashioned of material suitable for frictional contact with the ground, and they may readily be replaced when worn. The two arms or sections of the brake frame are provided with complementary joint flanges 13, and they are perforated to receive the joint bolts 14. The arms or frame sections are also formed with complementary half-round journal bearings 15, which are fitted over the bearing bushing and form a hub for the brake frame in order that the frame may be rocked or partially turned on the rear axle as a center.

At the top of the frame a perforated lug 16 is provided to which the rear end of the connecting rod 7 is pivoted, and in Figure 1 it will be seen that the lever 6 may be turned from dotted neutral position to full line position to bring the shoe 4 in contact with the ground. In this figure of drawing the arm 10 and shoe 4 have elevated the rear end of the car to lift the wheel 2 from the ground for the purpose of retarding or stopping the car, or for jacking up the rear end. By a forward movment of the lever 6 from dotted line position, the arm 11 and shoe 5 are swung down and forward to bring the shoe 5 to operative position as the car moves backward.

In combination with the brake device I employ a safety device to prevent displacement or loss of the brake apparatus, and anti-rattling means are also utilized in connection with the safety means. For this purpose an arm 17 is pivoted at 18 on an attaching plate 18' which is bolted to the chassis above the axle and above the brake arms, and a spring 19 is coiled about the bolt 18 with one end secured to the bolt and its other end secured to the arm 17, for holding the arm in normal dotted line position in Figure 2 and for returning it to such position after the brake shoes have been used. At the opposite ends of the suspending arm 17 safety chains 20 and 21 are carried and the lower ends of the chains are secured or anchored to the respective brake arms 11 and 10.

The range of movement of the rock arm 17 is limited by means of two stop lugs 22 and 23 that are rigidly secured to or integral with the attaching plate 18' of the chassis 1, in the path of movement of the arm, and the lugs also limit the movement of the brake arms as they are swung to operative position, to prevent displacement of the device.

As above described, and illustrated in the drawings it will be apparent that the brake device may with facility be applied to or installed on the rear axle of the vehicle, and is in position for ready access by the driver of the automobile in case of emergency when the brake is required. The parts are simple in construction and operation, and the apparatus is durable, and easily manipulated for the performance of its required functions.

Having thus fully described my invention, what I claim as new and desire to secure by Letters Patent is:—

1. A brake device comprising a bearing bushing and means for clamping the bushing on a vehicle axle, a brake frame journaled on the bushing and angularly disposed shoes on said frame, means for rocking the frame to operative position, a rocker arm pivoted above the frame and suspending chains connecting said arm and frame, and means for limiting the movement of the arm.

2. In a brake device the combination with an oscillatible frame and angularly spaced shoes thereon, of a pivoted arm above the frame, safety chains connecting the opposite ends of the arm to said frame, means for rocking the frame, and stop lugs in the path of movement of the ends of the arm for limiting movement of the arm.

3. The combiantion with a bearing bushing, of an oscillatible frame comprising arms having attaching flanges and half-round bearings to form a hub on the bushing, a lever device for oscillating the frame, shoes on said arms, an arm pivoted above the hub, safety chains connecting the ends of the arms with the frame-arms, and stop lugs in the path of movement of the ends of the pivoted arm.

In testimony whereof I affix my signature.
ELMER E. ENOS.